Patented Dec. 23, 1947

2,433,179

UNITED STATES PATENT OFFICE 2,433,179

RECLAIMED RUBBER AND METHOD OF MAKING SAME

Glynn P. Wheeler, Akron, Ohio, assignor to The B. F. Goodrich Company, New York, N. Y., a corporation of New York No Drawing. Application May 25, 1945, Serial No. 595,875

11 Claims. (Cl. 260—720)

This invention relates to reclaimed rubber and more particularly to a method for reclaiming vulcanized rubber and has for its principal objects the provision of a method of reclaiming vulcanized rubber which is applicable to widely varying types of scrap rubber including both natural and synthetic scrap, and which will produce a superior reclaimed rubber from a variety of such materials.

It is another object of this invention to improve the processability of reclaimed rubber, both natural and synthetic, with particular reference to the properties of plasticity, tack and ease of milling.

I have found a method of reclaiming vulcanized rubber which is effective for both natural and synthetic rubbers of the usual types. The method of this invention produces a plastic reclaimed rubber which is softer and more tacky than that produced by known methods. Reclaimed rubber obtained by the method of my invention possesses such superior properties of tack and cohesiveness that dry crumbs of the finished reclaimed rubber can be knitted together with mere finger-tip pressure and rolled into round balls between the fingers. Reclaimed rubber produced by other common methods must be given an expensive milling treatment and must be heavily loaded with pitches, tars and other softening agents before a coherent sheet can be formed. The reclaimed rubber of this invention may be used for all purposes for which reclaimed rubber has been used in the past and in addition, being highly plastic and tacky, it may be more easily processed and made into all-reclaim articles having superior properties. The physical test properties such as tensile strength, elongation, modulus and the like, of reclaimed rubber produced by the method of my invention are equal to or better than the best reclaimed rubber stocks produced by prior known methods.

To prepare the reclaimed rubber of this invention, I associate the vulcanized rubber, preferably in shredded or ground condition, with an aryl selenide. The mixture is heated until the rubber becomes plastic and processable, the heating times and temperature conditions being those usually employed in the conventional acid and alkali reclaiming processes. The lowest practicable temperature is in the range 100°–150° centigrade and the only upper limit is the decomposition temperature of the vulcanized rubber itself. A practical operating range has been found to be 175°–250° centigrade for most reclaiming operations using the method of this invention.

If the vulcanized rubber scrap contains fabric and it is desired to obtain a fabric-free reclaim stock, the scrap rubber may be given a digestion treatment by any of the conventional acid and alkali digestion processes either before or after the reclaiming treatment with the aryl selenide, or the vulcanized rubber may be given a concurrent neutral (zinc chloride) digestion. If the presence of fabric in the finished reclaimed rubber is not objectionable, and in many cases it is in fact desirable, then no such additional treatment is necessary.

The term "aryl selenide" has been employed herein and in the claims in the usual chemical sense to include compounds containing a selenyl group (H Se—) bonded to an aryl nucleus or to an alkyl substituent group on an aryl nucleus as well as compounds containing a seleno group (—Se—) bonded to two aryl nuclei or alkyl substituent groups on aryl nuclei or to another seleno group and an aryl nucleus or alkyl substituent on an aryl nucleus. Also, an alkyl substituent on an aryl group may be attached to one bond of the seleno group while an unsubstituted aryl group is attached to the others. The aryl nuclei may in any case have substituents of either or both aryl and aliphatic groups. In other words the compounds of this nature include aryl selenols, alkylaryl selenols, aralkyl selenols, diaryl monoselenides, di (alkylaryl) monoselenides, di (aralkyl) monoselenides, diaryl diselenides, di (alkylaryl) diselenides, di (aralkyl) diselenides and the like. Representative compounds of the aryl selenols are: phenyl selenol, naphthyl selenol, anthryl selenol and the like. Representative of alkyaryl selenols are: ortho xylyl selenol, p-tolyl selenol, butyl phenol selenol and the like. Examples of aralkyl selenols are: benzyl selenol, phenetyl selenol, naphthobenzyl selenol, and the like. Representative of the class constituting diaryl monoselenides are: diphenyl mono-selenide, di-alpha naphthyl mono-selenide, and the like. Examples of di (alkylaryl) mono-selenides are: di tolyl mono-selenide, di xylyl mono-selenide, phenyl p-tolyl monoselenide, p-tolyl ortho xylyl mono-selenide and the like. Examples of di (aralkyl) monoselenides are: dibenzyl monoselenide, di-alpha-naphthobenzyl mono-selenide, di phenetyl mono-selenide and the like. Representative of the class constituting diaryl diselenides are: diphenyl diselenide, di-alpha-naphthyl diselenide, and the like. Examples of di (alkylaryl) diselenides are: di ortho xylyl diselenide, phenyl p-tolyl diselenide, p-tolyl xylyl diselenide, di tolyl diselenide and the like. Examples of di (aralkyl) diselenides are: dibenzyl diselenide, di naphthobenzyl diselenide, diphenetyl diselenide and the like. These and others may be used in the practice of this invention. Also, mixtures of any of the above compounds may be used.

To illustrate the use of the above-mentioned groups of compounds constituting the aryl selenides in preparing the reclaimed rubber of this invention a number of specific examples are set forth:

Example I 500 grams of ground whole tire scrap (natural rubber) was mixed with 200 c. c. of an ethyl alcohol solution containing 2.5 gms. of phenyl selenol and the mixture heated in open steam at 125 p. s. i. for 16 hours. Following the treatment with phenyl selenol the rubber is placed in an autoclave and 110 grams of water and 90 grams of 48% aqueous sodium hydroxide solution added and the mixture heated at 195° to 210° centigrade for about 5 hours. The rubber was removed from the autoclave and washed several times on a corrugated laboratory wash mill to remove the adhering caustic and the fabric-free reclaim stock was dried in crumb form. The dried crumbs were then sheeted out on a rubber mill.

A reclaimed rubber stock produced by this method has excellent physical properties and in addition exhibits high plasticity and tack.

Example II 450 grams of ground tread scrap of the synthetic polymer of butadiene-1,3 and styrene (GRS-3) was admixed with 22.5 grams of diphenyl mono-selenide and placed in an autoclave with 160 grams of water and heated for approximately five hours at 195° to 210° centigrade. The rubber was removed from the autoclave and dried. This reclaimed rubber proved to have good milling properties. The stock exhibited properties which indicated its usefulness for reclaim treads or for admixture with crude butadiene-styrene copolymer for use in new tire treads.

Example III 100 grams of ground whole tire scrap of the synthetic polymer of butadiene-1,3 and styrene (GRS-3) was admixed with 2 grams of di-alpha-naphthyl di-selenide and 75 grams of water and heated in an autoclave at a temperature approximately 195° to 210° centigrade for five hours. After cooling, the reclaim is dried and then milled on a small laboratory mill and given 1 to 3 passes through a laboratory refiner mill. If it is desired to remove the fabric content of the reclaim stock, a conventional caustic digestion can be used following the above procedure, as was done in Example I.

This reclaimed rubber has a glossy sheen, which few reclaimed rubbers have unless they are heavily loaded with pitches, tars and oils. It has superior processing characteristics as indicated by its milling properties as well as high plasticity and softness. This reclaimed rubber stock sheets out smoothly on a rubber mill.

Example IV 450 grams of whole tire scrap of the synthetic polymer of butadiene and styrene (GRS-3) was admixed with 21.1 grams of dibenzyl diselenide and heated in an autoclave in the presence of 160 grams of water for five hours at temperatures of 195°–210° centigrade. An extremely useful reclaimed rubber stock was obtained by this process that had excellent milling properties.

Example V 450 grams of an oil-resistant scrap of the synthetic rubber made from butadiene 75 parts and acrylonitrile 25 parts was admixed with 9 grams of phenyl selenol and 160 grams of water and heated in an autoclave for approximately 5 hours. The reclaim was cooled, removed from the autoclave and dried. A plastic soft reclaim of excellent processing qualities was produced.

Example VI 450 grams of an oil-resistant rubber scrap of the neoprene type (polychloroprene) was mixed with 22.5 grams of phenyl selenol and 160 grams of water and heated in an autoclave at 195°–210° centigrade for approximately 5 hours. Physical testing of reclaimed rubber stock of this character indicates its usefulness for admixture with crude neoprene in the manufacture of oil resistant gaskets, sheeting and the like.

Example VII

The process of Example III was repeated except that the digestion treatment was different, the neutral zinc chloride process being used. In the latter process, 40 grams of zinc chloride and 1000 grams of water was added to the autoclave along with the phenyl selenol and the mixture heated for five hours at 195°–210° C. The rubber was cooled, removed from the autoclave and dried in crumb form. The dried crumbs were sheeted out on a rubber mill.

The processing qualities of the reclaimed rubber produced by this process were superior to previously known reclaimed rubber stocks and the physical properties of the vulcanizates produced from this reclaimed rubber were superior to those produced from the same scrap by the conventional acid or alkali digestion processes.

Example VIII

The process of Example I was repeated except that the sodium hydroxide digestion was performed before the heat treatment with phenyl selenol. The reclaimed rubber was removed from the autoclave and washed several times before proceeding with the phenyl selenol treatment. No significant difference was noted in either the physical properties or the processability of the reclaimed rubber produced by the method of this example as compared with that produced by the method of Example I.

It will be appreciated that any of the conventional digestion processes may be used in conjunction with aryl selenide plasticization or reclaiming treatment. The digestion may be performed either before or after the aryl selenide treatment. If the digestion is performed after the aryl selenide reclaiming operation, one washing operation will be eliminated for it is necessary to free the rubber of adhering acid or caustic before proceeding with the aryl selenide treatment.

In the practice of this invention a mixture of two or more aryl selenides may be used with equally satisfactory results. Usually, it will be preferred to employ mixtures such as the technical mixtures of the aryl selenides as ordinarily produced in synthesis of such compounds from technical grade raw materials.

In the practice of this invention it is possible to use widely varying amounts of the aryl selenide reclaiming agents depending on the type of reclaimed rubber desired. It has been found that the aryl selenides are greatly superior to known reclaiming agents and it is possible to obtain excellent reclaimed rubber with but a fraction of the amount of aryl selenide as compared with the amounts of other reclaiming agents usually employed. Especially good results have been obtained with 0.5 to 2.5 parts of aryl selenide per 100 parts of rubber scrap. Reclaimed rubbers may be produced with as much as 10 parts aryl selenide per hundred parts of scrap rubber and even larger amounts may be used where exceedingly soft products are desired.

As will be apparent from the foregoing discussion and specific examples, the invention is useful in reclaiming vulcanized rubbers in general, the term "vulcanized rubbers" and its singular form "a vulcanized rubber," being here employed in accordance with established usage in the art to comprise products prepared by vulcanizing any of the elastoprenes, some but not all of which have been listed by Fisher in his classification published in Industrial and Engineering Chemistry, vol. 31, No. 8, pp. 941–945, and including specifically the butadiene rubbers such as sodium butadiene rubber and the Buna rubbers such as Buna S (butadiene 1,3-styrene) or GRS-3 as it is known under the Government program, Buna N (butadiene 1,3-acrylonitrile) or Hycar OR15 and Perbunan as they are known to industry, the piperylene rubbers, the isoprene rubbers such as polyisoprene and natural rubber, the dimethylbutadiene rubbers, the haloprene rubbers such as polychloroprene, polybromoprene and the like. The foregoing elastoprenes, it will be noted, possess the common characteristics of being vulcanizable by appropriate vulcanizing agents.

Although I have herein disclosed certain specific embodiments of my invention the discovery is not limited thereto, for it will be appreciated that many variations such as substituting equivalent materials, varying the amounts of materials used, incorporating pitch, tar and other softening agents and utilizing different combinations of temperature and pressure are within the spirit and scope of the invention as defined in the appended claims.

I claim:

1. The method of reclaiming a vulcanized rubber which comprises associating the vulcanized rubber with from 0.5 to 10 parts per 100 parts of the vulcanized rubber of an aryl selenide and heating the said associated materials at a temperature from 100° to 250° C. until the vulcanized rubber is converted to a plastic reclaimed rubbery material.

2. The method of reclaiming a vulcanized rubber which comprises associating the vulcanized rubber with from 0.5 to 10 parts per 100 parts of the vulcanized rubber of an aryl selenol and heating the said associated materials at a temperature from 100° to 250° C. until the vulcanized rubber is converted to a plastic reclaimed rubbery material.

3. The method of reclaiming a vulcanized rubber which comprises associating the vulcanized rubber with from 0.5 to 10 parts per 100 parts of the vulcanized rubber of a diaryl monoselenide and heating the said associated materials at a temperature from 100° to 250° C. until the vulcanized rubber is converted to a plastic reclaimed rubbery material.

4. The method of reclaiming a vulcanized rubber which comprises associating the vulcanized rubber with from 0.5 to 10 parts per 100 parts of the vulcanized rubber of a diaryl diselenide and heating the said associated materials at a temperature from 100° to 250° C. until the vulcanized rubber is converted to a plastic reclaimed rubbery material.

5. The method of reclaiming a vulcanized rubber which comprises associating the vulcanized rubber with from 0.5 to 10 parts per 100 parts of the vulcanized rubber of phenyl solenol and heating the said associated materials at a temperature from 100° to 250° C. until the vulcanized rubber is converted to a plastic reclaimed rubbery material.

6. The method of reclaiming a vulcanized rubber which comprises associating the vulcanized rubber with from 0.5 to 10 parts per 100 parts of the vulcanized rubber of diphenyl monoselenide and heating the said associated materials at a temperature from 100° to 250° C. until the vulcanized rubber is converted to a plastic reclaimed rubbery material.

7. The method of reclaiming a vulcanized rubber which comprises associating the vulcanized rubber with from 0.5 to 10 parts per 100 parts of the vulcanized rubber of di-alpha-naphthyl diselenide and heating the said associated materials at a temperature from 100° to 250° C. until the vulcanized rubber is converted to a plastic reclaimed rubbery material.

8. The method of reclaiming a vulcanized rubber which comprises mixing the vulcanized rubber with from 0.5 to 10 parts per 100 parts of the vulcanized rubber of an aryl selenide and heating the mixture at a temperature from 100° to 250° C. until the vulcanized rubber is converted to a plastic reclaimed rubbery material.

9. The method of reclaiming a vulcanized rubber which comprises mixing the vulcanized rubber with from 0.5 to 10 parts per 100 parts of the vulcanized rubber of phenyl selenol and heating the mixture at a temperature from 100° to 250° C. until the vulcanized rubber is converted to a plastic reclaimed rubbery material.

10. The method of reclaiming a vulcanized rubber which comprises mixing the vulcanized rubber with from 0.5 to 10 parts per 100 parts of the vulcanized rubber of diphenyl monoselenide and heating the mixture at a temperature from 100° to 250° C. until the vulcanized rubber is converted to a plastic reclaimed rubbery material.

11. The method of reclaiming a vulcanized rubber which comprises mixing the vulcanized rubber with from 0.5 to 10 parts per 100 parts of the vulcanized rubber of di-alpha-naphthyl diselenide and heating the mixture at a temperature from 100° to 250° C. until the vulcanized rubber is converted to a plastic reclaimed rubbery material.

GLYNN P. WHEELER.

REFERENCES CITED

The following references are of record in the file of this patent:

UNITED STATES PATENTS

| Number | Name | Date |
| --- | --- | --- |
| 1,269,168 | Fahrenwald | June 11, 1918 |
| 2,193,624 | Garvey | Mar. 12, 1940 |
| 2,244,021 | Rosent et al. | June 3, 1941 |
| 2,359,122 | Kirby et al. | Sept. 26, 1944 |
| 2,372,584 | Kirby et al. | Mar. 27, 1945 |

Certificate of Correction

December 23, 1947.

Patent No. 2,433,179.

GLYNN P. WHEELER

It is hereby certified that error appears in the printed specification of the above numbered patent requiring correction as follows: Column 6, line 11, for "solenol" read *selenol*; and that the said Letters Patent should be read with this correction therein that the same may conform to the record of the case in the Patent Office.

Signed and sealed this 12th day of October, A. D. 1948.

[SEAL]

THOMAS F. MURPHY,
*Assistant Commissioner of Patents.*